US010099867B2

(12) United States Patent
Ge et al.

(10) Patent No.: US 10,099,867 B2
(45) Date of Patent: Oct. 16, 2018

(54) AUTOMATED PACKAGE UNLOADING SYSTEM

(71) Applicant: Amazon Technologies, Inc., Seattle, WA (US)

(72) Inventors: Chen Ge, Seattle, WA (US); Martin Peter Aalund, Seattle, WA (US); Samuel Gardner Garrett, Seattle, WA (US); Paul Roy Raines, Jr., Seattle, WA (US); Akhil Ranka, Seattle, WA (US); Sonia Thosar, Ann Arbor, MI (US); Toby Ge Xu, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/351,732

(22) Filed: Nov. 15, 2016

(65) Prior Publication Data

US 2018/0134501 A1 May 17, 2018

(51) Int. Cl.
| | |
|---|---|
| *B65G 47/91* | (2006.01) |
| *B65G 15/00* | (2006.01) |
| *B65G 21/14* | (2006.01) |
| *B65G 47/76* | (2006.01) |
| *B65G 67/24* | (2006.01) |

(52) U.S. Cl.
CPC ............ *B65G 47/91* (2013.01); *B65G 15/00* (2013.01); *B65G 21/14* (2013.01); *B65G 47/763* (2013.01); *B65G 67/24* (2013.01); *B65G 2201/025* (2013.01); *B65G 2201/0235* (2013.01)

(58) Field of Classification Search
CPC ... B65G 47/914; B65G 47/912; B65G 47/918
See application file for complete search history.

(56) References Cited

U.S. PATENT DOCUMENTS

| | | | |
|---|---|---|---|
| 4,453,874 A | 6/1984 | Veldhuizen et al. | |
| 5,015,145 A * | 5/1991 | Angell | B65G 61/00 |
| | | | 414/391 |
| 8,473,094 B2 * | 6/2013 | Becker | B65G 47/918 |
| | | | 294/65 |
| 9,725,257 B2 * | 8/2017 | Schenning | B65G 65/08 |
| 2015/0360882 A1 | 12/2015 | Girtman | |
| 2016/0137435 A1 * | 5/2016 | Tanaka | B65G 37/00 |
| | | | 414/564 |

FOREIGN PATENT DOCUMENTS

FR    2 318 089    2/1977

OTHER PUBLICATIONS

International Search Report and Written Opinion of co-pending, related PCT Application No. PCT/US2017/059856, dated Feb. 12, 2018.

\* cited by examiner

*Primary Examiner* — Mark C Hageman
(74) *Attorney, Agent, or Firm* — Thomas | Horstemeyer, LLP (57) ABSTRACT

Disclosed are various embodiments for an automated package unloading system. An automated package unloading system can include an end effector supported by a supporting frame which is mounted to a conveyor system. The end effector and/or the conveyor can be configured to move into and out of a container containing stacked packages. The end effector can be configured to attach to the packages and pull the packages from their original position. The end effector can further be configured to release the packages onto the underlying conveyor.

20 Claims, 10 Drawing Sheets

AUTOMATED PACKAGE UNLOADING SYSTEM

BACKGROUND

At a materials handling facility various items, articles, products, or packages may be organized for shipment to other locations. A variety of tasks may be performed in various types of materials handling facilities including, for example, receiving shipments of new inventory, storing new inventory in storage locations, picking items from the inventory storage locations in response to receiving orders, grouping the picked items, packing the items, readying the packed items for shipment, and sorting the packed items according to a final destination. As packages containing, for example, inventory and/or pre-packaged customer orders are received at materials handling facilities, the packages within the carrier vehicles are manually unloaded.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

The present disclosure relates to automating the process for unloading stacked packages from the trailer or container of a delivery vehicle at a materials handling facility. A materials handling facility may be a sort center, shipping center, packing center, distribution center, or other shipping, handling, or packing facility, among similar facilities. At materials handling facilities, carrier vehicles may deliver packages of inventory, prepackaged orders, and/or other types of packages. For example, at a sort center, prepared customer packages may be received for additional sorting according to destination (e.g., zip code, city, state) prior to the final shipment.

Typically, as vehicles carrying containers arrive at materials handling facilities, workers manually unload packages from the containers. By automating the unloading of packages at the materials handling facilities, the amount of unloading time, costs, and potential worker injury can be reduced. The automated package unloading system of the present disclosure is able to efficiently unload the multiple layers of packages stacked in the trailer or container received at the materials handling facility onto a mobile conveyor system which transports the packages to additional downstream processes (e.g., sorting, storing, shipping, etc.).

Figure 1:
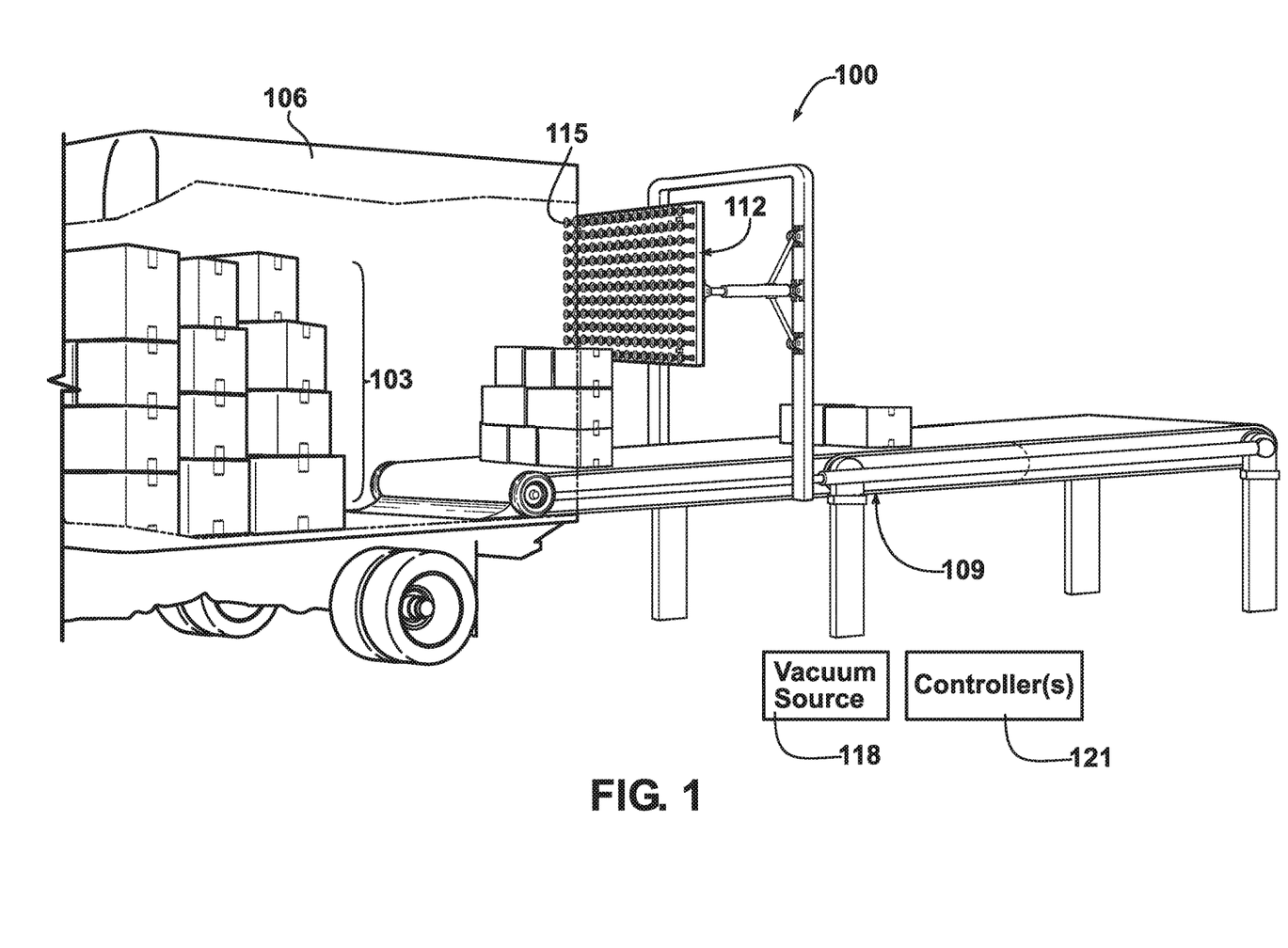
FIG. 1 is an example scenario of an automated package unloading system being used to unload packages from vehicle trailer onto an underlying conveyor system according to various embodiments of the present disclosure.

With reference to FIG. 1, shown is an example scenario of an automated package unloading system 100 of the present disclosure being used to unload stacked packages 103 from a container and/or trailer of a vehicle 106 (e.g., delivery truck) onto an underlying conveyor system 109 according to various embodiments of the present disclosure. In the example scenario of FIG. 1, the packages 103 are packed and stacked into the vehicle 106 (e.g., vehicle trailer, container, etc.) extending the width, length, and depth of the trailer or container of the vehicle 106. The packages 103 may comprise boxes, pails, containers, special packaging envelopes, and/or any other type of packaging.

According to various embodiments of the present disclosure, the automated package unloading system 100 of the present disclosure may be configured to move into the vehicle 106, attach to a face of one or more exposed packages 103, move in a backwards direction to pull the packages 103 from their original position, and release the packages 103 onto the underlying conveyor system 109. As the packages 103 are released onto the underlying conveyor system 109, the packages 103 are transported to another location. In some embodiments, movement of the vehicle 106 may be considered with respect to the movement of the automated package unloading system 100. For example, the vehicle 106 may be moved towards the automated package unloading system 100 rather than or in addition to the movement of the automated package unloading system 100 for the unloading of the stacked packages 103.

According to various embodiment, the automated package unloading system 100 comprises an end effector 112 comprising gripping components 115 that may be configured to attach to the face of one or more packages 103 in a vehicle 106. In the example scenario of FIG. 1, the gripping components 115 comprise vacuum suction cup components that are coupled to a vacuum source 118 that is configured to provide vacuum pressure to facilitate the attachment of the gripping components 115 to the face of the packages 103. As discussed in more detail with respect to FIG. 2, the gripping components 115 are not limited to vacuum suction cup components, and may comprise foam elements, electrostatic components, adhesive components, and/or any other type of suitable component for attaching to the packages 103.

According to various embodiments, the automated package unloading system 100 is coupled to an underlying conveyor system 109. In some embodiments, the automated package unloading system 100 is separate from the underlying conveyor system 109. The conveyor system 109 may include a belt conveyor, a line shaft roller conveyor with a plurality of rollers, a chain conveyor, and any other conveyor system that can advance packages 103 from one location to another. In some embodiments, the conveyor system 109 is a mobile conveyor. In other embodiments, the conveyor system 109 may comprise a stand-alone conveyor. In some embodiments, the conveyor system 109 is a telescoping conveyor such that one end of the conveyor system 109 can telescope in and out, as can be appreciated. For example, the conveyor system 109 may comprise a mechanism which is configured to release additional portions of a conveyor belt as the end of the conveyor system 109 telescopes out and expands into the trailer. In another non-limiting example, the conveyor system 109 may comprise a conveyor belt which is positioned about multiple rollers in a configuration such that as the conveyor system 109 expands, the position of the rollers changes and the conveyor belt positioned about the multiple rollers expands, thereby providing additional length to the conveyor belt and conveyor system 109 as needed. In some embodiments, the conveyor system 109 may comprise wheels 612 (FIG. 6A) configured to allow the conveyor system 109 to move into and out of the container of the vehicle 106.

According to various embodiments, the operation of the automated package unloading system 100 and the conveyor system 109 is controlled by controller(s) 121 which can be in data communication with the automated package unloading system 100, the conveyor system 109, the vacuum source 118, and/or any other component as can be appreciated. The controller(s) 121 can be any suitable computing or processing device configured to perform processing tasks and/or control operation of equipment. In some embodiments, a single controller 121 controls the operation and processing tasks of all the equipment. In other embodiments, the controller(s) 121 may comprise multiple controllers 121 that are each configured to control the operation and/or processing tasks of the equipment components independent of one another.

Figure 2:
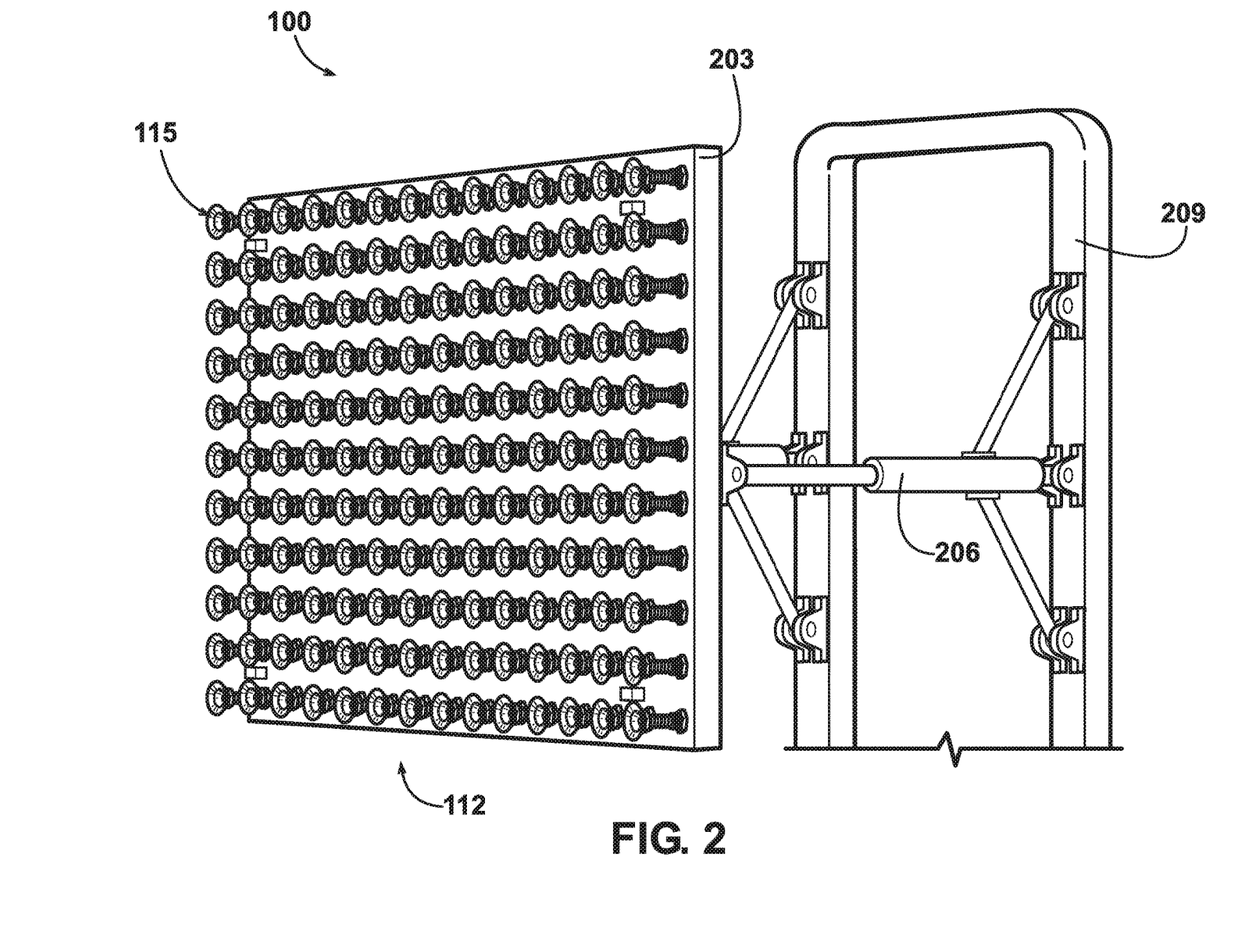
FIG. 2 is an example of a perspective view of the automated package unloading system of FIG. 1 according to various embodiments of the present disclosure.

With reference to FIG. 2, shown is an example of the automated package unloading system 100 of FIG. 1 according to various embodiments of the present disclosure. The automated package unloading system 100 may comprise a supporting frame 209, a pair of horizontal arms 206, and an end effector 112. The supporting frame 209 is coupled to the one or more horizontal arms 206 and is a support frame for the end effector 112. In some embodiments, the supporting frame 209 comprises an inverted U-shaped frame. In other embodiments, the supporting frame 209 may comprise a single vertical member extending along a vertical axis (y-axis) relative to the one or more horizontal arms 206. In some embodiments, the supporting frame 209 can be coupled to the conveyor system 109 (FIG. 1). In other embodiments, the supporting frame 209 may be a stand-alone frame that is not attached to the conveyor system 109.

According to various embodiments, the one or more horizontal arms 206 are coupled substantially perpendicular to the supporting frame 209. The one or more horizontal arms 206 can be configured to move in a reciprocating motion relative to the supporting frame 209 about the horizontal axis (e.g., the x-axis). The one or more horizontal arms 206 may comprise a pneumatic actuator, a hydraulic actuator, an electrical actuator, a ball screw actuator, a vacuum actuator, and/or any other type of member which can allow reciprocating movement about the horizontal axis relative to the supporting frame 209.

The end effector 112 is configured to engage with and attach to one or more packages 103 stacked in various layers within a container of a vehicle 106. According to various embodiments, the end effector 112 comprises gripping components 115 attached to a manifold plate 203. The gripping components 115 may include vacuum suction cups, foam, electrostatic plates, adhesive material, and/or any other type of gripping component as can be appreciated. In some embodiments, each gripping component 115 is attached to the manifold plate 203 via respective bores of the manifold plate 203. In other embodiments, each gripping component 115 may be directly attached to the face of the manifold plate 203.

According to various embodiments, the end effector 112 may be sized to obtain one or more vertical and/or horizontal layers of packages 103 stacked in a vehicle 106 (e.g., vehicle trailer, container, etc.). For example, assuming that the dimensions of a container containing the stacked packages 103 include a width of 8 feet and a height of 10 feet, the end effector 112 may be sized to have a width of 7 feet and a height of 8 feet. In some embodiments, the end effector 112 may be sized to allow a bottom layer of packages to remain in the vehicle 106. As discussed in further detail with respect to FIGS. 6 and 7, the conveyor system 109 may be configured to engage with the bottom layer of packages 103.

Figure 3:
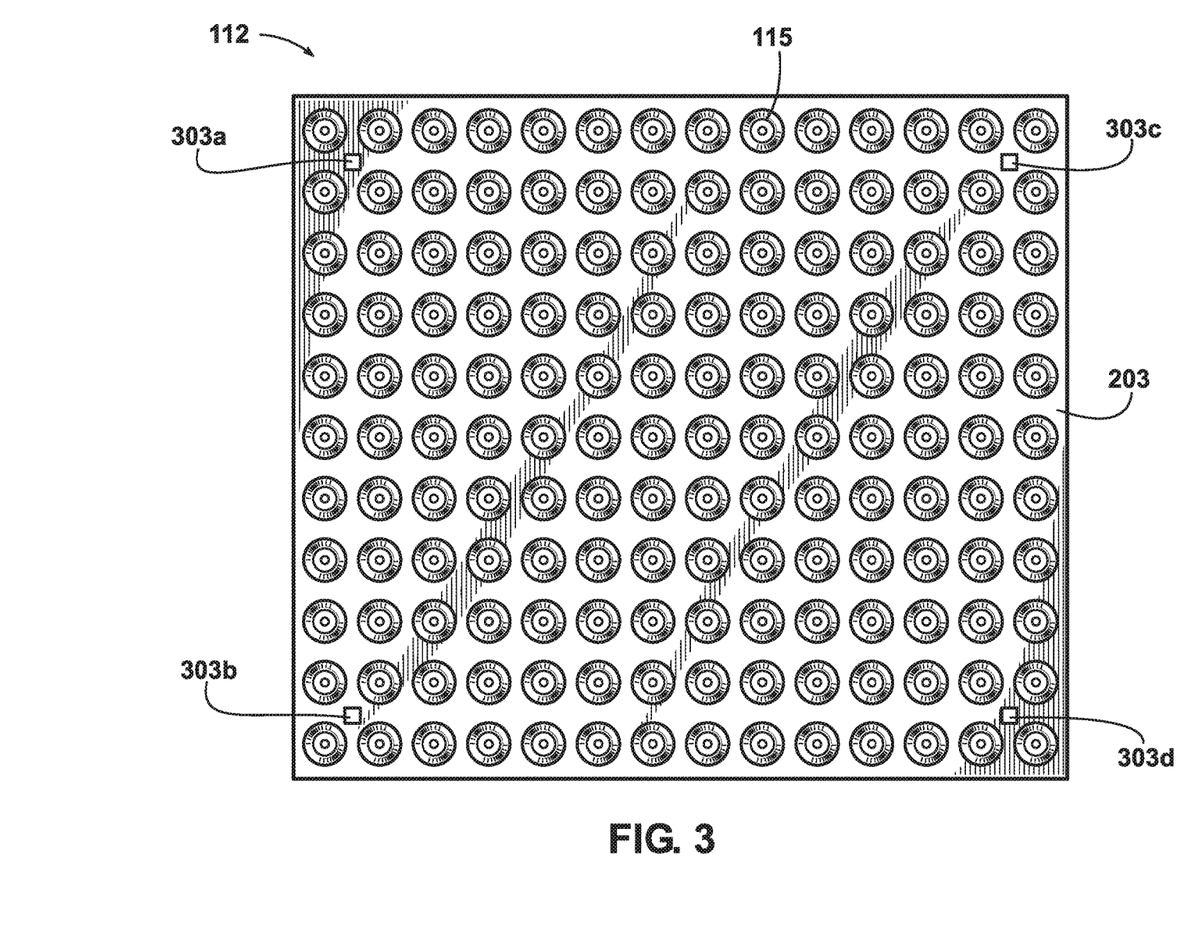
FIG. 3 is an example of a front view of an end effector of the automated package unloading system of FIG. 2 according to various embodiments of the present disclosure.

With reference to FIG. 3, shown is an example of a front view of the end effector 112 of FIGS. 1 and 2 according to various embodiments of the present disclosure. Specifically, FIG. 3 illustrates an example of the face of the end effector 112 showing the gripping components 115 extending outwardly from the manifold plate 203. While FIG. 3 illustrates the layout of the gripping components 115 as an array, it should be noted that the layout of the gripping components 115 is not limited to an array. For example, the layout of the gripping components 115 may comprise a concentric layout, a zig-zag layout, and/or any other type of suitable layout that would allow the desired layers of packages to be removed.

The face of the end effector 112 can further comprise end effector sensors 303a, 303b, 303c, and 303d (hereinafter "303"). The end effector sensors 303 may be in data communication with the controller 121 (FIG. 1). The end effector sensors 303 can comprise any type of sensor or camera (e.g., two dimensional (2D) or three dimensional (3D) cameras) as can be appreciated that can detect the position, presence, and/or proximity of an exposed layer of packages 103 within the vehicle 106. Upon analysis of the data received from the end effector sensors 303, the controller 121 may determine the distance in which the end effector 112 is to move forward to facilitate attachment of the gripping components to the packages 103. For example, based on the analysis of the data received from the end effector sensors 303, the controller 121 may drive reciprocating movement of the end effector 112 via the one or more horizontal arms 206 and/or the conveyor 109 to move the required distance for the gripping components 115 to attach to the packages 103.

It should be noted that while FIG. 3 illustrates four end effector sensors 303, the amount of end effector sensors 303 is not limited to four sensors. For example, in some embodiments, the end effector 112 may comprise only one end effector sensor 303. In other embodiments, the end effector 112 may comprise more than one end effector sensor 303. In addition, the positions of the end-effector sensors 303 are not limited to the positions shown in FIG. 3. For example, the end-effector sensors 303 may be located in the center of the end effector 112 and/or any other location.

Figure 4:
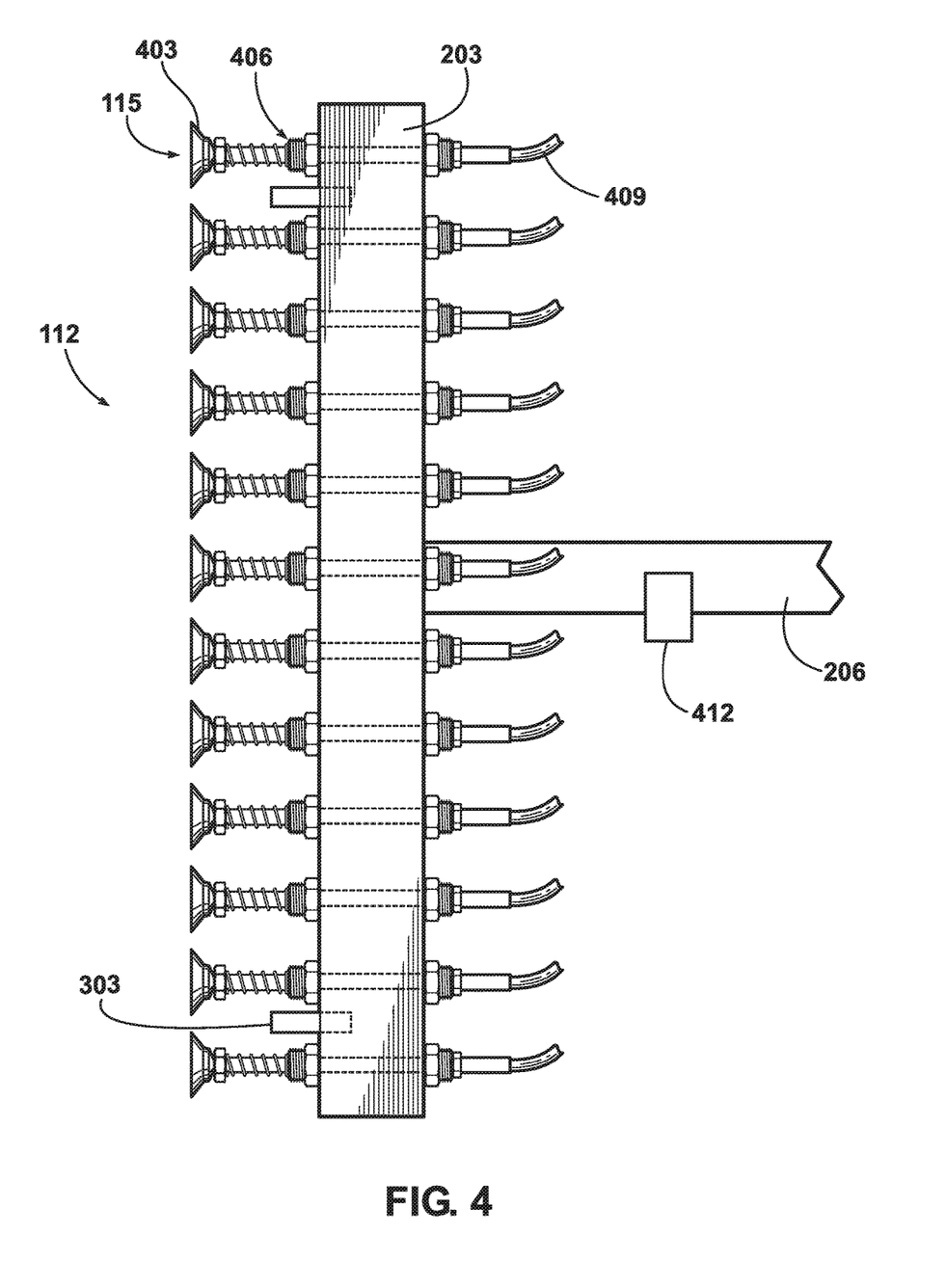
FIG. 4 is an example of a side view of a portion of the automated package unloading system of FIG. 2 according to various embodiments of the present disclosure.

With reference to FIG. 4, shown is an example of a side view of the automated package unloading system 100 illustrating the end effector 112 and a portion of the horizontal arm(s) 206, according to various embodiments of the present disclosure. Specifically, FIG. 4 illustrates the gripping components 115 mounted to the manifold plate 203. In this example, each gripping component 115 comprises a gripping interface 403 coupled to a spring-loaded compensator 406 which is inserted through a respective manifold plate bore and securely fastened to the manifold plate 203. The spring-loaded compensator 406 may be used to compensate for uneven layers of packages 103. For example, assume that a layer of packages 103 comprises four different sized boxes. Further, assume that the face of the layer of packages 103 is uneven due to the different positioning and/or size of the packages 103. By having each gripping interface 403 coupled to a separate spring-loaded compensator 406, the position of individual gripping components 115 can vary to compensate for the unevenness of the layer of packages 103.

It should be noted that while the gripping interface 403 of FIG. 4 illustrates a bellow suction cup, the gripping interface 403 may comprise a foam member, an electrostatic plate, an adhesive material, and/or any other suitable interface that could be used to securely attach to a package 403 for unloading from the vehicle 109.

In some embodiments, each gripping component 115 may comprise an actuator device (e.g., pneumatic, hydraulic, electrical, etc.) that could provide additional degrees of freedom for movement of the gripping interface 403 as can be appreciated.

FIG. 4 further illustrates a vacuum hose 409 extending from a distal end of the gripping component 115 which extends outwardly from a back side of the manifold plate 203. The vacuum hose 409 is used to couple the gripping component 115 to a vacuum source 118 (FIG. 1) for providing the vacuum pressure needed to attach each gripping component 115 to a package 103. In some embodiments, the vacuum source 118 generates a substantially even amount of vacuum pressure at each of the vacuum hoses 409. In other embodiments, the vacuum source 118 may be configured to limit the vacuum pressure through one or more of the vacuum hoses 409. For example, if one of the gripping components 115 will not engage with a package, the vacuum source 118 may be configured to limit vacuum pressure to that specific gripping component 115.

FIG. 4 further illustrates a horizontal arm 206 coupled to the end effector 112. In some embodiments, the horizontal arm 216 may comprise a sensor(s) 412. The sensor 412 may comprise any type of sensor that is capable of sensing the presence and/or position of one or more packages 103 moving on a portion of the underlying conveyor system 109. The sensor 412 may be in data communication with the controller 121. In some embodiments, if the sensor 412 does not detect a presence of a package 103 after a predetermined amount of time, the controller 121 may determine that the prior layer of packages has been unloaded and that the end effector 112 may be repositioned to grasp the next layer of packages 103 for unloading.

Figure 5:
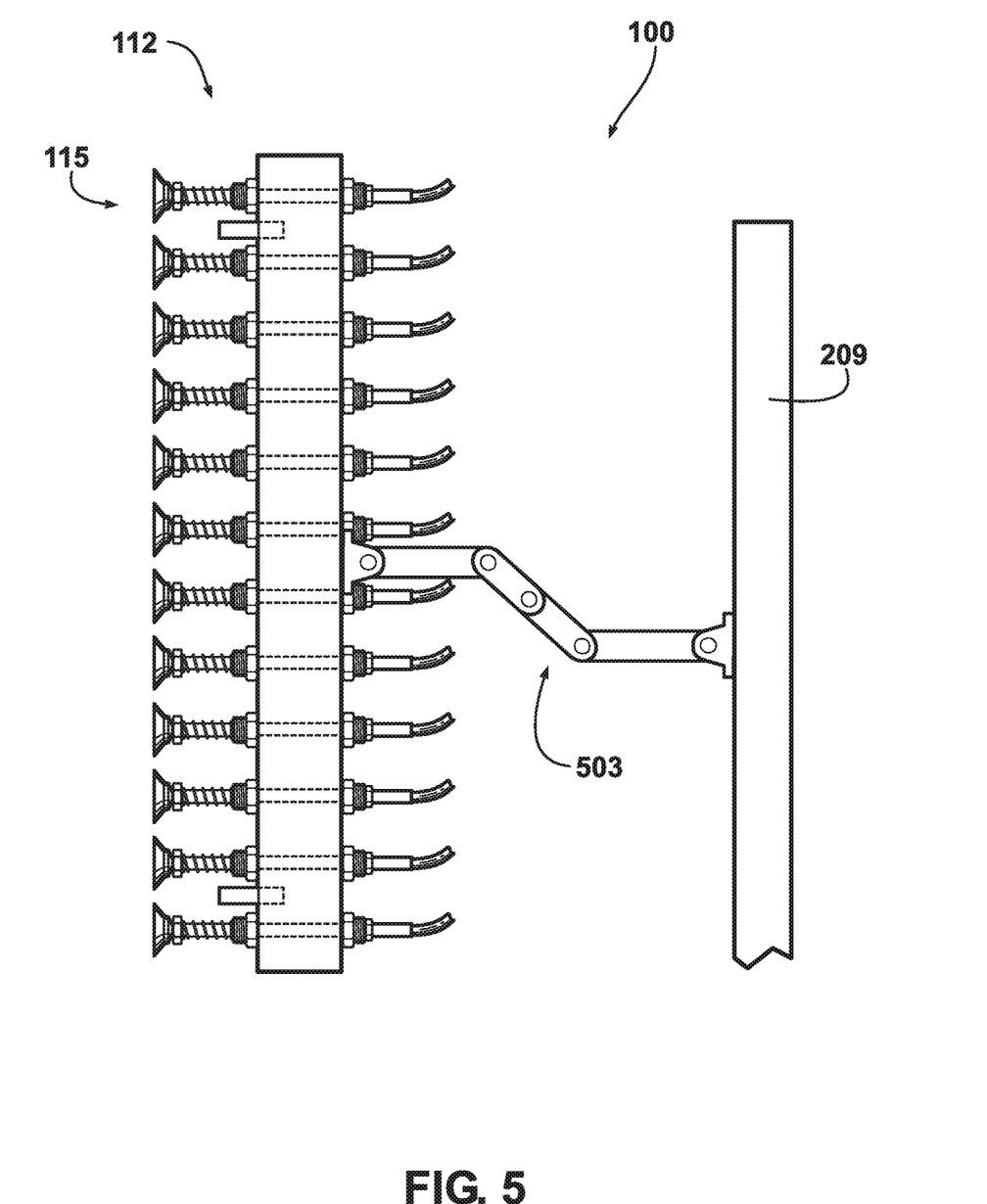
FIG. 5 is an example of a side view of an automated package unloading system according to various embodiments of the present disclosure.

Turning now to FIG. 5, shown is an example of a side view of another embodiment of the automated package unloading system 100 according to various embodiments of the present disclosure. The automated package unloading system 100 of FIG. 5 differs from the automated package unloading system 100 of FIGS. 1, 2, and 4 in that the end effector 112 is coupled to the supporting frame 209 via an articulating arm 503 rather than one or more horizontal arms 206. The use of the articulating arm 503 provides for additional directional movement of the end effector 112. The articulating arm 503 may comprise a four-bar linkage, a simple rotational joint, multiple rotational joints, and/or any other type of mechanism(s) that can allow for the additional directional movement of the end-effector 112. The articulating arm 503 shown in FIG. 5 allows for movement of the end effector about both the vertical axis and horizontal axis relative to the supporting frame 209. In some embodiments, the links of the articulating arm 503 each comprise a bar. In some embodiments, the movement of articulating arm 503 is manipulated by the controller 121. In other embodiments, one or more links in the articulating arm 503 may comprise pneumatics, hydraulics, motors, and/or any other type of actuator.

The articulating arm 503 may comprise any arrangement of links that allows the desired movement of the end effector 112 about the horizontal axis and/or vertical axis relative to the supporting frame 209. In some embodiments, the arrangement of the articulating arm 503 may allow for the rotation of the end effector about the horizontal axis transverse to the length of the underlying conveyor system 109. For example, in some embodiments, if a package 103 is sized such that it would not be allowed to pass under the end effector 112 when the face of the end effector 112 is positioned as shown in FIG. 5, the positioning of end effector 112 may need to be adjusted to allow for passage of the package 103 under the end effector 112. The articulating arm 503 may be configured to allow the plate of the end effector 112 to be tilted so that the bottom edge of the end effector 112 can draw up to allow packages 103 on the underlying conveyor 109 to pass underneath. In other embodiments, the articulating arm 503 may be configured to allow an elliptical movement of the end effector relative to the container of the vehicle 106. In addition, by providing separate articulating arms 503 on each lateral side of the end effector 112, and operating each of them independently of the other, other, the end effector can be moved through more complex paths. For example, by operating only one of the articulating arms 503, the end effector can be moved about a vertical axis, like a door.

Figures 6, 6A:
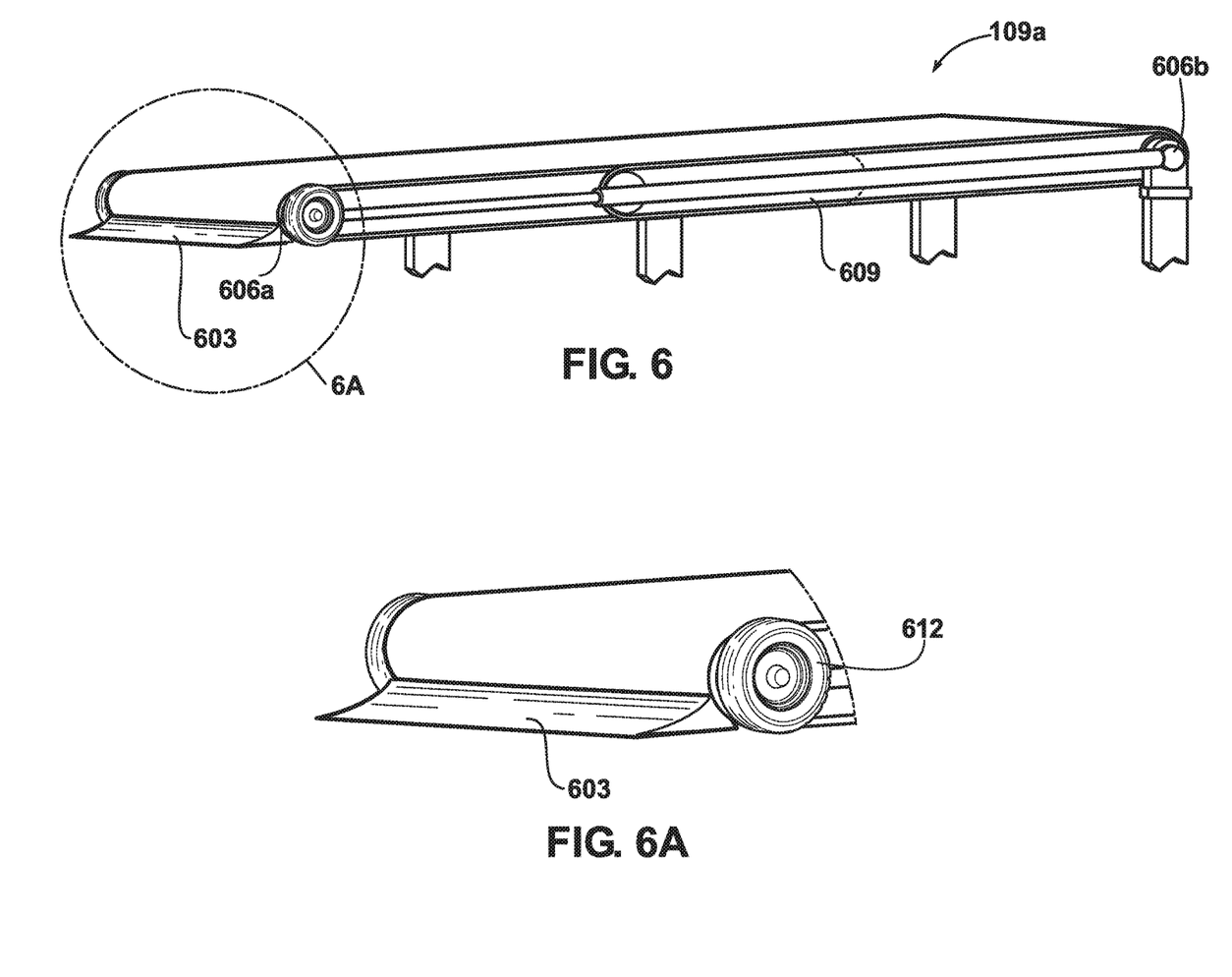
FIG. 6 is a perspective view of a conveyor system according to various embodiments of the present disclosure.
FIG. 6A is an example of an expanded view of a scoop component of the conveyor system of FIG. 6.

Referring next to FIG. 6, shown is an example of a perspective view of a conveyor system 109a according to various embodiments of the present disclosure. The conveyor system 109a may include a belt conveyor, a line shaft roller conveyor with a plurality of rollers, a chain conveyor, and any other conveyor system that can advance packages 103 from one location to another. In some embodiments, the conveyor system 109 is a mobile conveyor. In other embodiments, the conveyor system 109 may comprise a stand-alone conveyor. In some embodiments, the conveyor system 109 is a telescoping conveyor such that one end of the conveyor system 109 can telescope in and out, as can be appreciated. In other embodiments, the conveyor system 109 is a non-retractable conveyor.

According to various embodiments, the conveyor system 109 may comprise a conveyor frame 609 supporting a plurality of rollers 606 (e.g., 606a, 606b) along the length of the conveyor frame 609. The rollers 606 can rotatable about an axis that extends in a direction generally transverse to the direction of movement of the conveyor (e.g. belt) to allow movements of packages from the container to another location.

In some embodiments, the conveyor system 109 may comprise wheels 612 (FIG. 6A) that allow movement of the conveyor system 109 along the longitudinal axis of the conveyor system 109. In some embodiments, the wheels 612 are coupled to outer ends of the proximate rollers 612. In other embodiments, the wheels 612 may be coupled to the outer ends of the distal rollers 606b. In other embodiments, both the proximate roller 606a and the distal roller 606b may comprise wheels 612.

In FIG. 6, the proximate end of the conveyor system 109a comprises a scoop component 603 disposed near the proximate roller 606a of the conveyor system 109a. FIG. 6A illustrates an expanded view of the scoop component 603.

The scoop component 603 may be configured to engage with a bottom layer of packages 103 on the vehicle 106. Accordingly, as the conveyor system 109a is moved into the vehicle 106, the scoop component 603 may engage with the underside of the bottom layer of packages 103. For example, as the scoop component 603 is pushed in, the bottom layer of packages 103 may engage with a moving conveyor belt allowing the package 103 to be taken away on the conveyor system 109a to another location. In some embodiments, the scoop component 603 may be coupled to a vacuum source 118 (FIG. 1) to provide suction via the scoop component 603 to further facilitate the engagement of a package 103 to the conveyor system 109a. For example, the scoop component 603 may comprise vacuum channels that are coupled to the vacuum source 118. As a package 103 engages with the scoop component 603, the vacuum pressure generated by the vacuum source 118 may create a suction between the package 103 and the vacuum channels of the scoop component 603.

Figure 7:
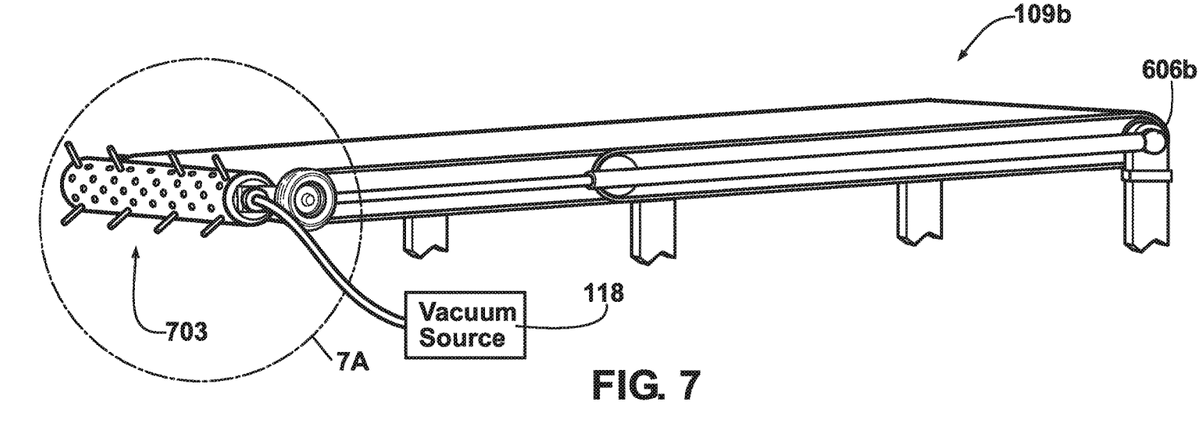
FIG. 7 is a perspective view of a conveyor system according to various embodiments of the present disclosure.
Figure 7A:
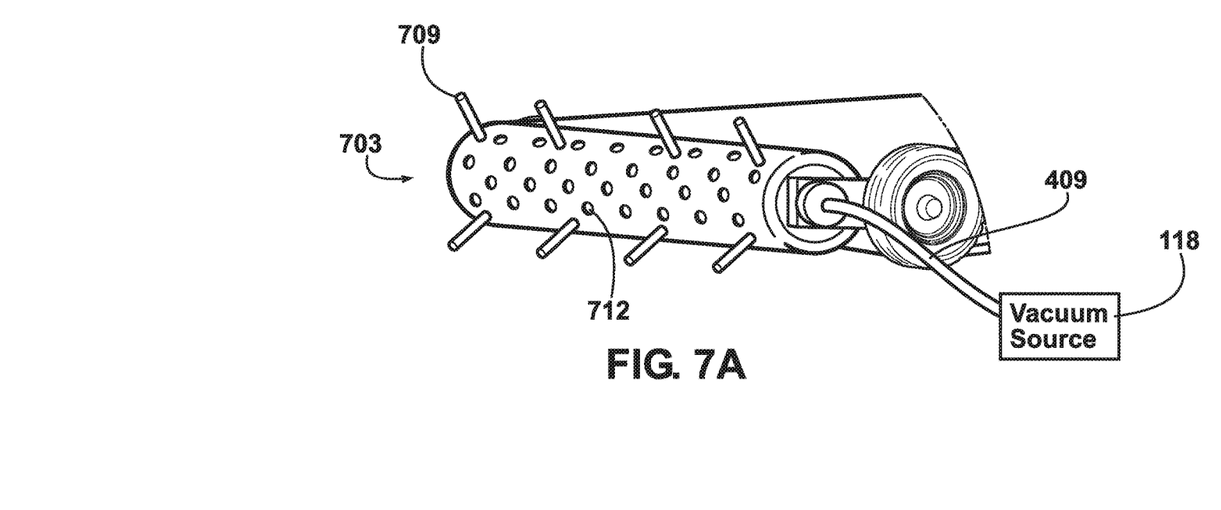
FIG. 7A is an example of an expanded view of a gripping roller of the conveyor system of FIG. 7.

Turning now to FIG. 7, shown is an example of a perspective view of another embodiment of a conveyor system 109b according to various embodiments of the present disclosure. In FIG. 7, the proximate end of the conveyor system 109b comprises a gripping roller 703 coupled to the proximate roller of the conveyor system 109b. FIG. 7A illustrates an expanded view of the gripping roller 703.

The gripping roller 703 may be configured to engage with a bottom layer of packages 103 on container of the vehicle 106 and facilitate movement of the packages 103 onto the conveyor system 109. According to various embodiments, the gripping roller 703 comprises a roller extending about the width of the conveyor system 109. The gripping roller 703 comprises a main body having one or more apertures 712 disposed about the outer surface of the roller and one or more fingers 709 extending outwardly from the main body. The apertures 712 may comprise vacuum channels that are coupled to a vacuum source 118 (FIG. 1). The vacuum source 118 may provide air flow that creates a vacuum pressure at each of the apertures 712. The vacuum pressure may facilitate engagement of a package 103 with the gripping roller 703 to allow movement of the package 103 from the vehicle 106 onto the conveyor system 109b. The one or more fingers 709 may be used to engage with a package 103 and further facilitate movement of the package 103 onto the conveyor system 109b as can be appreciated.

Figure 8:
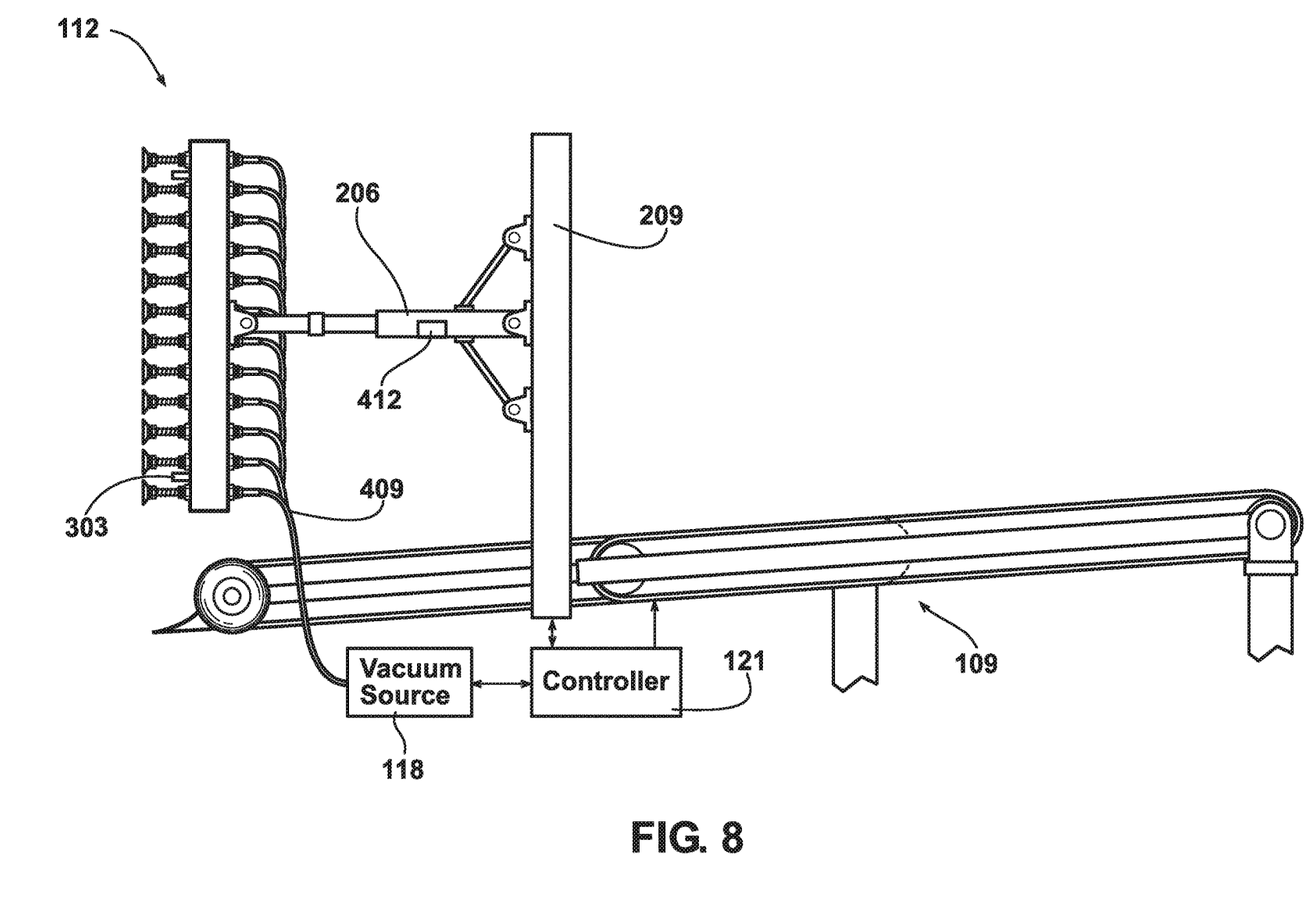
FIG. 8 is an example of a perspective view of the automated package unloading system of FIG. 2 mounted to and over the conveyor system of FIG. 6 along with the vacuum source and controller that operates the automated package system according to various embodiments of the present disclosure.

Moving on to FIG. 8, shown is a side view of the automated package unloading system 100 coupled to the conveyor system 109 according to various embodiments of the present disclosure. Specifically, FIG. 8 illustrates the automated package unloading system 100, the conveyor system 109, the vacuum source 118, and the controller(s) 121.

The vacuum source 118 can comprise any type of vacuum generator and/or vacuum pump that is capable of providing the amount of the vacuum pressure needed to create a suction for attaching the gripping components 115 to the face of the packages 103. The vacuum source 118 is coupled to the gripping components 115 via a vacuum hose 409 (FIG. 4). The vacuum source 118 can further be configured to generate and provide vacuum pressure to the gripping roller 703 (FIG. 7) or scoop component 603 (FIG. 6) of the conveyor system 109 to help facilitate movement of a package 103 from the vehicle 106 onto the conveyor system 109 for transportation to another location. For example, in some embodiments, the vacuum source 118 may be coupled to the gripping roller 703 of a conveyor systems 109 and can be configured to generate vacuum pressure to facilitate engagement and movement of a package 103 with the gripping roller 703 as the gripping roller 703 rotates. As the gripping roller 703 rotates, the package 103 can move onto the conveyor system 109b. In other embodiments, the vacuum source 118 may be coupled to the scoop component 603 via a vacuum hose 409.

The controller(s) 121 can be any suitable computing or processing device configured to perform processing tasks and/or control operation of equipment. In particular, the controller(s) 121 can be configured to process and/or transmit data as can be collected from the end effector sensors 303 and/or the conveyor sensors 412. For example, the controller(s) 121 can be configured to determine a distance between the end effector 112 and a detected layer of packages 103 according to an analysis of the data collected from the end effector sensors 303.

In another example, the controller(s) 121 can be configured to determine whether any additional packages 103 are on the conveyor system 109 that could interfere with the operation of the automated package unloading system 100 using data collected from the conveyor sensor(s) 412 (FIG. 4). For example, if the controller(s) 121 determines that there are no more packages 103 on a particular portion of the conveyor system 109, the controller(s) 121 may be configured to determine that the automated package unloading system 100 can be operated to unload additional packages 103 from the container. However, if the controller 121, via the data received from the conveyor sensor(s) 412 determines that packages 103 are present on the portion of the conveyor system 109, the controller(s) 121 may wait a determined time before initiating further operation of the automated package unloading system 100. For example, the controller(s) 121 may wait a predetermined amount of time between detection of a package 103 on the portion of the conveyor system 109.

In addition, the controller(s) 121 can be configured to communicate with the vacuum source 118 and control activation and/or termination of the vacuum pressure to the gripping components 115, the scoop component 603 (FIG. 6), and/or the gripping roller 703 (FIG. 7). For example, the controller 121 can be configured to direct the vacuum source 118 to begin generating the vacuum pressure needed to attach the gripping components 115 to the face of the packages 103 when the end effector 112 has been moved to the required position for attachment. In another non-limiting example, the controller 121 can be configured to direct the vacuum source 118 to terminate generation of the vacuum pressure, thereby causing release of the packages 103 from the end effector 112 and onto the underlying conveyor system 109.

The controller(s) 121 can further be configured to operate the various components of the automated package unloading system 100. For example, in some embodiments, the controller 121 can be configured to operate the horizontal arms 206 which in turn can move the end effector 112 in the forward and/or backward directions along the horizontal axis relative to the supporting frame 209. For example, the controller 121 can be configured to control the movement of the horizontal arms 206 in the backward and forward directions allowing the end effector 112 to engage with the packages 103 and pull the packages 103 from the original position and onto the conveyor system 109.

In other embodiments, the controller 121 can be configured to operate the articulating arm 503 to move the end effector 112 as can be appreciated according to the particular application desired. For example, if the end effector 112 needs to move in a forward direction along the horizontal axis in order to engage with the face of a layer of packages 103, the controller 121 may be configured to operate one or more links of the articulating arm 503 to facilitate desired movement.

According to various embodiments, the controller 121 can be configured to operate the conveyor system 109. For example, assuming the conveyor system 109 is a telescoping conveyor, the controller 121 can be configured to operate the telescoping behavior of the conveyor system 109. Specifically, the conveyor system 109 can be configured to control the movement of the conveyor system 109 into and out of the vehicle 106.

In some embodiments, the controller(s) 121 comprise a controller that is configured to control the operation of and process tasks associated with all of the components of the vacuum source 118, the conveyor system, the automated package unloading system 100 and/or other components. In other embodiments, the controller(s) 121 may comprise multiple controllers 121 that are each configured to control the operation of one or more components independent of one another. For example, the vacuum source 118 may be controlled by a first controller 121 that is separate from a second controller 121 that is configured to control the operation of the end effector 112.

Figure 9:
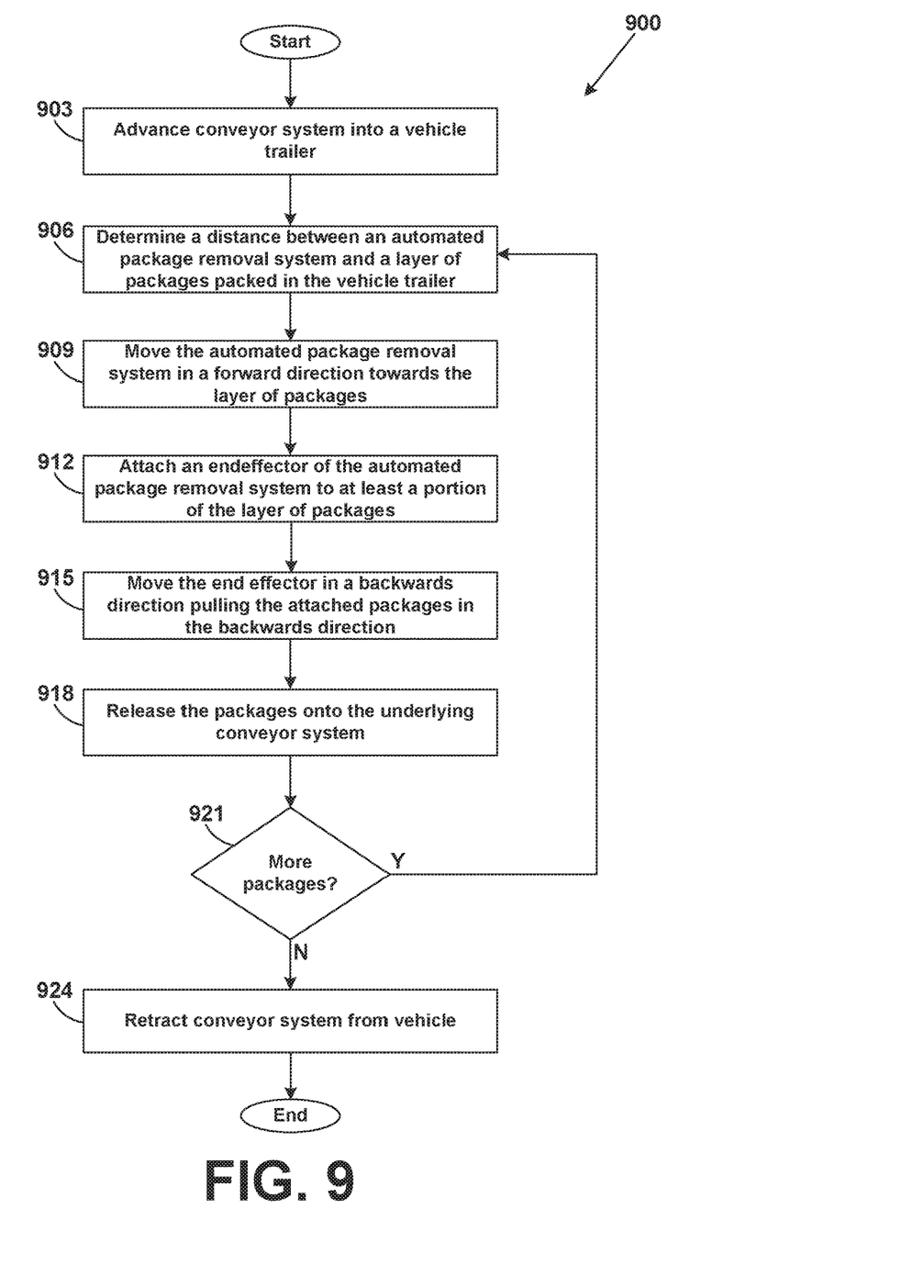
FIG. 9 is a flowchart depicting an unloading operation using the automated package unloading system of FIG. 1 according to various embodiments of the present disclosure.

With reference to FIG. 9, shown is shown is a flowchart that represents an example of the operation of an automated package unloading operation 900 according to various embodiments of the present disclosure. It is understood that the flowchart of FIG. 9 provides merely an example among others of the operation of the automated package unloading operation 900 as described herein. As an alternative, the flowchart of FIG. 9 may be viewed as depicting an example of steps of a method performed by the automated package unloading operation according to one or more embodiments.

Beginning at box 903, the conveyor system 109 (FIG. 1) comprising the automated package unloading system 100 (FIG. 1) is advanced into a vehicle 106 (FIG. 1) containing multiple packages 103 (FIG. 1) to be unloaded. In some embodiments, the conveyor system 109 is a telescoping conveyer, and the controller(s) 121 (FIG. 1) is configured to control the extending and/or retracting features of the conveyor system 109. At box 906, the distance between the automated package unloading system 100 and a layer of packages stacked in a trailer of the vehicle 106 is determined. In various embodiments, the end effector 112 (FIG. 1) of the automated package unloading system 100 comprises one or more end effector sensors 303 (FIG. 3) which are configured to detect the position, presence, and/or proximity of the packages 103. The end effector sensors 303 can be in data communication with the controller(s) 121, and the controller(s) 121 can be configured to analyze the data received from the end effector sensors 303 and determine the distance between the end effector 112 and an exposed layer of packages 103.

At box 909, the automated package unloading system 100 is moved into the vehicle in a forward direction along the horizontal axis relative to the supporting frame 209 (FIG. 2) towards the layer of packages 103 that are packed in the vehicle 106. Specifically, the controller(s) 121 are configured to control the operation of at least one of the end effector 112 and/or the conveyor system 109 to move in the forward direction. For example, the controller(s) 121 may cause the one or more horizontal arms 206 (FIG. 2) and/or the articulating arm 503 (FIG. 5) to move in the forward direction for the determined distance, as can be appreciated.

In another example, the controller(s) 121 may drive movement of the conveyor system 109 to facilitate the extension of the conveyor system 109 into the container of the vehicle 106, thus moving the mounted automated package unloading system 100 into the container as the conveyor system 106 extends into the container of the vehicle 106. In another embodiments, the controller(s) 121 may be configured to drive the movement of both the conveyor system 109 and the end effector 112 via control of the horizontal arms 206 and/or the articulating arm 503 to move in the forward direction at the predetermined distance. In other embodiments, the controller(s) 121 may consider movement of the vehicle 106 while driving the movement of the conveyor system 109 and/or the end effector 112. For example, the vehicle 106 may move relative to the conveyor system 109 as the package unloading system 100 attaches to and release the packages onto the conveyer system 109 for unloading.

At box 912, the gripping components 115 of the end effector 112 of the automated package unloading system 100 are attached to the layer of packages 103. For example, assume that the gripping components 115 comprise the vacuum suction cup components. In this example, the controller(s) 121 may activate the vacuum source 118 (FIG. 1) to generate the vacuum pressure required to create the required seal between the gripping components 115 and the face of the one or more packages 103, thereby attaching the gripping components 115 to the one or more packages. In another example, the gripping components 115 may comprise electrostatic components (e.g., electrostatic plates), and the controller(s) 121 may be configured to generate the appropriate electrostatic charge required to attach the gripping components 115 to the one or more packages 103.

At box 915, the end effector 112 moves in a backwards direction along the horizontal axis relative to the supporting frame 209 pulling the attached layer of packages 103 from their original position. In some embodiments, the controller(s) 121 control the operation of the one or more horizontal arms 206 and/or the articulating arm 503 to move in the backwards direction, as can be appreciated. In other embodiments, the controller(s) 121 are configured to control the retracting operation of the conveyor system 109. In other embodiments, the controller(s) 121 are configured to drive the movement of both the end effector 112 via the one or more horizontal arms 206 and/or the articulating arm 503 and the conveyor system 109 to pull the packages from the stack.

At box 918, the packages 103 attached to the gripping components 115 are released onto the underlying conveyor system 109 and taken to another location. In some embodiments, the controller(s) 121 may cause the vacuum source 118 to terminate generation of the vacuum pressure. In other embodiments, the controller(s) 121 may direct termination of an electrical charge generation. Regardless of how the packages 103 are released, the packages 103 will fall onto the underlying conveyor system 109 for transport to another location.

At box 921, the controller(s) 121 determines whether there are more packages 103 to be unloaded. Specifically, an analysis of the data from the one or more end effector sensors 303 can be used to determine whether there are more packages 103 to be unloaded. If there are more packages 103 within the vehicle 106, the process proceeds to box 906. Otherwise, processor proceeds to box 924 where the conveyer system 109 retracts from the vehicle 106 and the process ends.

Although the flowchart of FIG. 9 shows a specific order of execution, it is understood that the order of execution may differ from that which is depicted. For example, the order of execution of two or more boxes in FIG. 9 may be scrambled relative to the order shown. Also, two or more boxes shown in succession in FIG. 9 may be executed concurrently or with partial concurrence. Further, in some embodiments, one or more of the blocks shown in FIG. 9 may be skipped or omitted. It is understood that all such variations are within the scope of the present disclosure.

Figure 10:
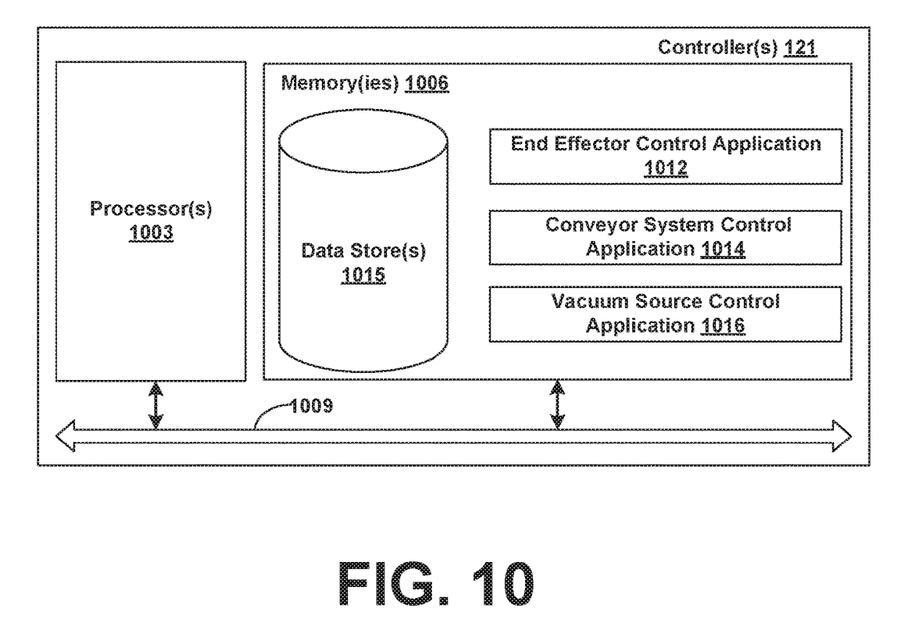
FIG. 10 is a schematic block diagram that provides one example illustration of the controller that operates the automated package unloading system of FIG. 2 according to various embodiments of the present disclosure.

With reference to FIG. 10, shown is a schematic block diagram of the controller 121 according to an embodiment of the present disclosure. The controller 121 includes at least one processor circuit, for example, having a processor 1003 and a memory 1006, both of which are coupled to a local interface 1009. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the end effector control application 1012, the conveyor system control application 1014, the vacuum source control application 1016, and potentially other applications. The end effector control application 1012 can be executed to process data received from the end effector sensors 303 and conveyor sensors 412. The end effector control application 1012 can further be executed to control the operation and movement of the automated package unloading system 100. The conveyor system control application 1014 can be executed to control the operation of the conveyor system 109, including the operations of retracting and extending portions of the conveyor system 109, the rotation of the rollers 606, the positioning of the conveyor system 109 relative to the container and/or any other operation of the conveyor system 109. The vacuum source control application 1016 can be executed to control the operation of the vacuum source 118. Also stored in the memory 1006 may be a data store 1015 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the end effector control application 1012, the conveyor system control application 1014, the vacuum source control application 1016, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 9 shows the functionality and operation of an implementation of portions of the end effector control application 1012, the conveyor system control application 1014, and the vacuum source control application 1016. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Also, any logic or application described herein, including the end effector control application 1012, the conveyor system control application 1014, and the vacuum source control application 1016, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the end effector control application 1012, the conveyor system control application 1014, and the vacuum source control application 1016, may be implemented and structured in a variety of ways. For example, one or more applications described may be implemented as modules or components of a single application. Further, one or more applications described herein may be executed in shared or separate controllers 121 or a combination thereof.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus for facilitating an unloading of packages from a container, the apparatus comprising:
   a conveyor system comprising a conveyor frame and a conveyor belt, the conveyor belt being supported by the conveyor frame and being moveable about the conveyor frame relative to a length of the conveyor frame;
   a supporting frame mounted on the conveyor frame of the conveyor system, the supporting frame comprising a first section and a second section being interconnected via a third section, the first section being attached to a first side of the conveyor frame and the second section being attached to an opposing second side of the conveyor frame, the supporting frame being substantially perpendicular to a length of the conveyor system;
   an end effector assembly coupled to the supporting frame and being moveable about a horizontal axis relative to the supporting frame, the end effector assembly comprising:
      a manifold plate extending along a vertical plane that is substantially parallel to the supporting frame;
      a gripping component coupled to and extending outwardly from the manifold plate along the horizontal axis relative to the supporting frame, the gripping component being configured to engage with one or more of the packages stacked in the container; and
      one or more first sensors, the one or more first sensors being configured to generate data indicating a distance between the end effector assembly and the packages;
   a pair of horizontal members coupled substantially perpendicular to the supporting frame and being laterally offset from one another, wherein the end effector assembly is directly coupled to the supporting frame via the pair of horizontal members; and
   the second sensor attached to an underside of at least one of the pair of horizontal members, a second sensor being configured to generate data indicating a position of at least one of the packages on an underlying portion of the conveyor belt of the conveyor system.

2. The apparatus of claim 1, wherein the gripping component comprises a gripping interface coupled to a spring-loaded compensator.

3. The apparatus of claim 2, wherein the gripping interface comprises at least one of a vacuum suction cup, a foam member, or an electrostatic plate.

4. The apparatus of claim 1, and wherein each of the pair of horizontal members comprises at least one of a pneumatic actuator, a hydraulic actuator, or an electrical actuator.

5. The apparatus of claim 1, further comprising a controller being configured to drive movement of the end effector assembly into and out of the container.

6. The apparatus of claim 1, further comprising a vacuum source coupled to the gripping component.

7. The apparatus of claim 1, wherein the conveyor frame of the conveyor system is moveable relative to the horizontal axis of the supporting frame, and movement of the end effector assembly is driven by movement of the conveyor frame.

8. The apparatus of claim 1, wherein the conveyor system comprises a telescoping conveyor system.

9. A method, comprising:
   determining, via one or more controllers, a distance between an automated package unloading system and one or more packages packed in a container, the automated package unloading system comprising a U-shaped supporting frame being coupled to a conveyor system, and the U-shaped supporting frame being substantially perpendicular to a length of the conveyor system;

driving, via the one or more controllers, movement of an end effector of the automated package unloading system towards the one or more packages into the container according to the distance, the end effector being directly coupled to the U-shaped supporting frame via a pair of horizontal arms that are substantially perpendicular to the U-shaped supporting frame, the end-effector being moveable about a horizontal axis relative to the U-shaped supporting frame, and the end effector comprising a manifold plate extending along a vertical plane that is substantially parallel to the supporting frame, and one or more gripping components coupled to and extending outwardly from the manifold plate along the horizontal axis relative to the supporting frame;

attaching one or more gripping components of the automated package unloading system to the one or more packages;

pulling the one or more packages by driving, via the one or more controllers, the movement of the end effector out of the container; and releasing the one or more packages from the one or more gripping components onto the conveyor system for transport to another location, wherein determining the distance between the automated package unloading system and the one or more packages packed in the container is based at least in part on data generated by a first sensor of the automated package unloading system, and wherein a second sensor attached to an underside of at least one of the pair of horizontal arms is configured to generate data indicating a presence status of the one or more packages on the conveyor system.

10. The method of claim 9, wherein the end effector is movable in a reciprocating motion relative to the length of the conveyor system.

11. The method of claim 9, wherein the one or more gripping components attach to the one or more packages via at least one of a vacuum pressure or an electrostatic force.

12. The method of claim 9, further comprising driving, via the one or more controllers, the movement of the conveyor system into the container.

13. The method of claim 9, wherein the one or more packages comprise a plurality of packages stacked on top of one another, and further comprising:

leaving a bottom layer of packages in the container; and scooping, via the conveyer system, the bottom layer of packages onto the conveyor system.

14. A system, comprising:

a U-shaped supporting frame; and an end effector assembly coupled to the U-shaped supporting frame and being moveable about a horizontal axis relative to the U-shaped supporting frame, the end effector assembly comprising:

a manifold plate extending along a vertical plane that is substantially parallel to the U-shaped supporting frame; and at least one gripping component coupled to and extending outwardly from the manifold plate, the at least one gripping component being configured to engage with one or more packages;

a pair of horizontal arms coupled substantially perpendicular to the U-shaped supporting frame, the end effector assembly being directly coupled to the U-shaped supporting frame via the pair of horizontal arms; and a sensor attached to an underside of at least one of the pair of horizontal arms, the sensor being configured to generate data indicating a presence status of an object.

15. The system of claim 14, wherein a respective horizontal arm of the pair of horizontal arms comprises at least one of a pneumatic actuator, a hydraulic actuator, or an electrical actuator.

16. The system of claim 14, wherein the at least one gripping component comprises a gripping interface coupled to a spring-loaded compensator.

17. The system of claim 14, wherein the at least one gripping component comprises at least one of a vacuum suction cup, a foam member, or an electrostatic plate.

18. The system of claim 14, further comprising a vacuum source coupled to the at least one gripping component.

19. The system of claim 14, further comprising a conveyor system and wherein the U-shaped supporting frame is directly mounted to the conveyor system.

20. The system of claim 14, further comprising another sensor configured to generate data indicating a distance between the end effector assembly and the one or more packages.

* * * * *